United States Patent [19]

Elsbett et al.

[11] 4,311,009
[45] Jan. 19, 1982

[54] INTERNAL COMBUSTION ENGINE

[76] Inventors: Ludwig Elsbett; Günter Elsbett, both of Industriestr. 14, D8543 Hilpoltstein, Fed. Rep. of Germany

[21] Appl. No.: 199,196

[22] Filed: Oct. 21, 1980

Related U.S. Application Data

[63] Continuation of Ser. No. 28,903, Apr. 11, 1979, abandoned, which is a continuation of Ser. No. 729,942, Oct. 6, 1976, abandoned.

[30] Foreign Application Priority Data

Oct. 7, 1975 [DE] Fed. Rep. of Germany ....... 2544813

[51] Int. Cl.³ .................. F02D 23/00; F02B 37/00
[52] U.S. Cl. ................................ 60/605; 60/597
[58] Field of Search ........................ 60/605, 597

[56] References Cited

U.S. PATENT DOCUMENTS 3,162,998  12/1964  Williams ........................ 60/605

FOREIGN PATENT DOCUMENTS

| 2154726 | 11/1971 | Fed. Rep. of Germany | 60/605 |
| 103765 | 4/1964 | Norway | 60/605 |
| 324836 | 2/1930 | United Kingdom | 60/605 |
| 350712 | 6/1931 | United Kingdom | 60/605 |

Primary Examiner—Wendell E. Burns
Attorney, Agent, or Firm—Becker & Becker, Inc.

[57] ABSTRACT

An internal combustion engine, especially Diesel engine, with cylinders arranged adjacent to each other in one cylinder block. Each of said cylinders is connected through conduits to an air intake system and an exhaust gas discharge system. The conduits of cylinders which follow each other in the working cycle of the engine are matched with each other as to length and cross section, and at least the conduits of the matched air intake system are connected to a common air container. At least the air container is combined with the motor block of the engine to form a unit, and is provided with connections for the air intake and exhaust gas outlet systems.

3 Claims, 5 Drawing Figures

INTERNAL COMBUSTION ENGINE

This is a continuation of application Ser. No. 028,903, filed Apr. 11, 1979, now abandoned, which was a continuation of Ser. No. 729,942, filed Oct. 6, 1976, now abandoned.

The present invention relates to an internal combustion engine, especially Diesel engine with the cylinders arranged adjacent to each other in one motor block, while each of said cylinders is connected through conduits to an air intake and an exhaust system, and while the respective conduits of the cylinders following each other as to the working cycle are matched in length and cross section with regard to each other and while at least the conduits of the matched air exhaust system are combined to a conduit leading to a common air container.

In order to be able to conduct the combustion of a fuel with a minimum of harmful emissions with an internal combustion engine such as a Diesel engine, it is necessary in addition to take a number of steps with regard to the combustion chamber, to pay particular attention to the air intake system. Tests with corresponding internal combustion engines have shown that in particular the delivery rate of combustion air can be brought into a proper relationship to the prevailing fuel when the conduits leading to the cylinders, especially the intake conduits of cylinders succeeding each other are matched in length and cross section with regard to each other in such a way that for each cylinder nearly the same quantity of air for the combustion with fuel can be kept available. To this end, frequently the conduits of cylinders following each other are combined to a common collecting pipe, and this collecting pipe is then connected to a supply of air. Analogous to the design and arrangement of the conduits of the intake system, also the conduits of the exhaust system of cylinders following each other are combined to a collecting pipe, and it is this collecting pipe which, depending on the type of the internal combustion engine, is either conveyed into the atmosphere or prior thereto is conveyed to a turbocharger. Regardless of whether the conduits and thereby also their collecting pipe lead directly into an air supply or into the atmosphere or whether the air leads to a charger group, it is necessary to provide the necessary pipe length in the intake as well as in the exhaust system. Due to a compact construction of the internal combustion engine, frequently difficulty is encountered in providing the necessary pipe length in the intake as well as in the exhaust system. In particular, with Diesel engines operating with a mixed mixture and direct injection of a fuel into a combustion chamber it is difficult to keep the length of the conduits for all cylinders the same. A further difficulty is encountered when for matching the pipes it is necessary to mount an equalizing container for the interruption of the oscillations of the air columns. With internal combustion engines with supercharge by means of a supercharger there occurs the further drawback that in particular the suction pipes have to be passed around the cylinder head to the exhaust side and to the turbocharger. This causes particular difficulties with regard to the bend of the pipes and the mounting thereof. If, for instance, also the conduits of the exhaust system are designed in conformity with the gas dynamics, so many pipes, containers and turbo structures will extend around the cylinder head, that the access to the remaining portion of the motor block or parts of the internal combustion engine will be greatly interferred with. In spite of the considerable number of structural elements, it is frequently not possible to obtain even an approximate uniformity of the pipe length for all cylinders.

With the heretofore known internal combustion engine for instance a Diesel engine with six cylinders of the above mentioned type working onto the same crank shaft system, the cylinders which do not interfere with each other as to their working cycle are connected through conduits, so-called tap conduits (Stichleitungen) to a common connecting line for three successive cylinders and this connecting line is connected through a pressure equalizing container to a supply of air. The intake system utilized with such an internal combustion engine has conduits matching in length and cross section with regard to each other. These last mentioned conduits are arranged on the internal combustion engine within the region of the cylinder head. Analogous to the design of the conduits on the intake system, it is possible also to design the corresponding conduits of the exhaust system in conformity with the intake system and to combine the conduits leading from the respective cylinders and not interfering with each other in their working operation to a respective common conduit and to discharge the exhaust through a compensating container or directly into the atmosphere (see German Gebrauchsmuster Registration No. 1039402).

Various tests have been conducted with internal combustion engines with a direct injection of a fuel into combustion chambers and these tests have shown that in addition to the necessity of a high twist effect about the axis of an internal combustion engine of combustion air rushing into a combustion chamber, also a sufficient delivery rate as to combustion air is necessary in order after a corresponding intermixing of air and fuel particles to carry out the combustion proper. To this end, it is necessary with internal combustion engines with a free intake, that in addition to the intake moment of the piston, also the kinetic energy of the air column especially in the intake system can be taken advantage of and that the opening and closing times of the combustion chamber can be so controlled that during the open phase of the combustion chamber as well as the exhaust gases therein be blown into the exhaust gas system and that also the necessary quantity of air can be introduced into the combustion chamber for a new combustion. To meet this requirement, and in particular the introduction of the necessary air into the combustion chamber, encounters difficulties because during the relatively short opening phase of the combustion chamber not the entire air necessary for the combustion can be introduced in the combustion chamber because in view of the lacking length of the air column only a small portion thereof is in motion while the remaining portion has to be withdrawn from the remaining air supply installation, for instance the compensating container. This air column in the compensating container has, however, hardly any kinetic energy so that this air column will by itself not have the tendency, when the combustion chamber is open, to discharge into said combustion chamber. To this end, in particular the air intake systems of internal combustion engines are equipped with turbochargers, the blowers of which are actuated by kinetic energy of the exhaust gas column in the exhaust gas system and by means of said turbo blower, automatically an additional combustion air is during the opening phase of the combustion chamber pressed into the latter (see German Motor Technical Periodical "MTZ" of Aug. 26, 1965, pages 329–338).

It is an object of the present invention to avoid the above outlined drawbacks of internal combustion engines with regard to the location and arrangement of the conduits, and the intake and exhaust systems thereof and to extend the conduits in particular in order to make available the corresponding delivery rates as to combustion air without exceeding the space available for the installation of such conduits.

These and other objects and advantages of the invention will appear more clearly from the following specification in connection with the accompanying drawing, in which.

Figure 1:
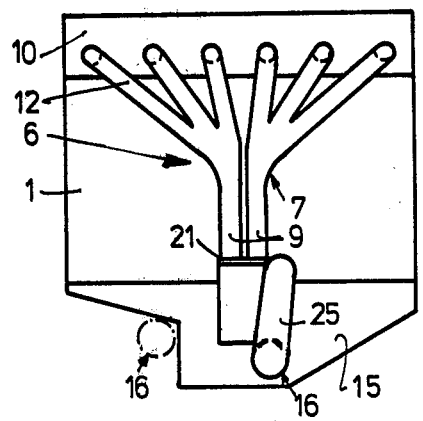
FIG. 1 is a side view of a motor block with two exhaust systems arranged adjacent to each other with the conduits thereof extending up to approximately the lowest point of the motor block.

The objects outlined above have been realized with a combustion engine according to the present invention in that at least the air container extends through the motor block of the internal combustion engine and is combined with the latter to a unit while being equipped with extensions for the system.

These features make it possible to design the conduits leading to the cylinders as well as the intake and discharge system not only longer but also more uniform inasmuch as due to the corresponding prevailing expansion space, the conduits can be arranged in a more uniform and flow-favorable manner. Tests have shown that an arrangement of the conduits as uniform and long as possible will be possible particularly when the conduits themselves or the collecting line extends to approximately the nearest point of the internal combustion engine and the air container is there passed through the motor block or integrated therewith. Such most favorable points for the passing for instance of the air container may be for instance the oil pan of the internal combustion engine which for purposes of catching the spray oil is as a rule arranged at the lowest point of the motor block and usually also forms a component of the motor. By such an arrangement of the intake and exhaust gas system the advantage will be realized that in many instances no service-requiring parts of the internal combustion engine will become inaccessible in view of the intake and/or exhaust gas system. These systems are rather passed by surfaces of the motor block which are not blocked by other parts. In view of the gain in charging air due to the longer conduits, it will also be assured that the combustion chamber will be filled up with the required intake air per intake stroke so that in view of such more favorable mixing ratio between intake air and fuel, not only a good combustion but also an optimum power match will be possible.

In addition thereto, due to the more satisfactory shape of the conduits of the intake and exhaust gas system, these systems can be manufactured not only in a similar manner but can be more easily equipped with the necessary inserts such as for instance twist elements and the like. A further feature of the invention consists in that at least the air container is passed through an oil wetted chamber of the motor block. Furthermore, according to a further feature of the invention, the air container may be designed as at least one compensating container.

The above mentioned features make it possible to arrange the frequently larger and heretofore more difficult to mount compensating container in a space where it can be easily mounted.

Analogous to this design of the air container, the air container may according to further features of the invention also be designed as a collecting pipe for combined conduits or as a charging air cooler. Also in this instance, it is effective when these larger structural elements are arranged where there is sufficient space for their installation.

A further feature of the invention is characterized in that the air container is designed as at least one diffuser. Such diffuser may have its mantle extending through the space provided with cooling fins extending in the longitudinal direction of the diffuser. These cooling ribs or fins may be covered by a mantle of the chamber which at the end face has inlet and outlet openings for a cooling medium passed between the cooling ribs. Such a design of the air container would have the advantage that with a corresponding connection of the air container to a turbo blower, the latter not only makes available the necessary air column for the intake system but also by the cooling medium flowing along the chamber through which a diffuser extends cools said chamber. This may be very important when the diffuser is passed through said chamber, for instance through the oil pan. In order to avoid the necessity of passing the cooling medium for the diffuser not through a space below, it is suggested according to a further feature of the invention that the diffuser at its one end is provided with jet nozzles leading into the atmosphere for aiding the suction of the cooling medium.

Figure 2:
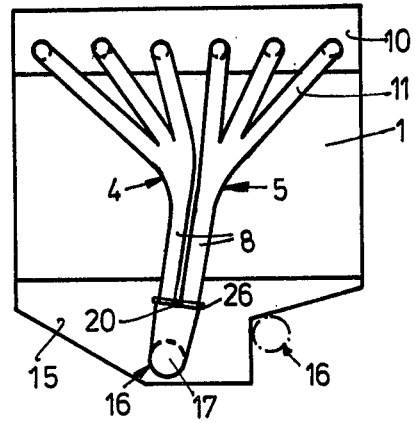
FIG. 2 is a side view of two intake systems with the conduits likewise extending approximately to the lowest point of the motor block.

Referring now to the drawing in detail, FIG. L shows the motor block 1 of an internal combustion engine with for instance six cylinders 3 which work onto a common crank drive 2. At both sides of the motor block there are provided intake and exhaust systems 4,5 and 6,7 respectively. The intake as well as the exhaust gas systems are respectively formed by two strands which respectively have a common collecting lines or trunks 8 and 9 and comprise a plurality of tap lines or branch lines 11, 12 which branch off from the collecting lines 8 and 9 respectively and lead into the pertaining cylinder 3 and cylinder heads 10. The lines 11 and 12, three of which in each instance are combined into a common collecting line 8 and 9 respectively lead from the collecting line to the respective cylinders 3 the working strokes of which do not overlap each other. This condition also prevails for the branch lines 11 of the intake systems 4,5 and for the branch lines 12 of the discharge systems 6, 7. The connection of the branch lines 11, 12 with the cylinders 3 is respectively provided on a cylinder head 10. These connections are so arranged that on one side of the cylinder head there are provided all connections for the intake systems 4, 5 while on the other side of said cylinder head there are provided all connections for the discharge systems 6, 7. The Branch lines 11, 12 as well as the intake and discharge systems 4,5 and 6,7 and therewith also the respective common connecting lines 8,9 for the respective three branch lines extend along the side walls 13, 14 of the motor block 1 and with their respective common connecting lines 8,9 extend to approximately the lowest point thereof. The lowest point of the motor block 1 is in this instance formed by an oil pan 15 located below a crank drive 2. According to the particularly illustrated embodiments, within the region of the lowest point of the crank housing and crank drive 2 there is provided an air container 16 which is integrated with the crank housing and oil pan 15. The air container 16 which may be passed through the oil wetted chamber of the motor block 1 or through the oil pan.15 itself is according to FIGS. 1 and 2 designed as a compensating container 17 and according to FIG. 3 as an oil cooler 18 while according to FIG. 4 said air container is designed as a diffuser 19. The air container 16 which at both sides of the motor block 1 respectively carries a connection 20, 21 for a suction connection 22 and also carries an intake connection for a pressure connection 23 (see FIG. 5) there is connected to the suction connection a pressure connection 24 of a turbocharger 25 arranged on the left hand side of the motor block 1. To the pressure connection 23 of the air container 16 there is respectively connected the intake connection 26 of the common collecting line 8 of the collecting and branch lines 8, 11 forming the intake systems 4 and 5 respectively. The turbocharger 25 which comprises an intake section 27 leading to an intake group for instance an air filter, additionally comprises suction and pressure connections 28, 29 respectively for the exhaust system 6, 7. Its suction connections 28 are connected to the connecting lines 9 of the exhaust systems 6,7 and its separate or combined pressure connections 29 may extend into the atmosphere. The length and dimensions of all conduits i.e. branch lines 11 and collecting lines 8, may in particular be adapted to the intake systems 4, 5 in such a way that in each strand comprising a branch line 11 and a collecting line 8, approximately the same air volumes may be kept. In the six cylinder engine shown in FIG. 2, the intake systems 4 and 5 for two segments 4 and 5, the segment 4 serving the first three cylinders and the second segment serving the second three cylinders. As is seen in FIG. 2, the branches 11 connecting to the cylinder at the ends of the block 1 are the longest, the branches 11 connected to the cylinder juxtaposed with the cylinders adjacent to the end of the block are shorter and the branches connected to the two innermost cylinders are the shortest. This brings about the advantage that a uniform acceleration of the air columns in said conduits will be possible so that at the time of the combustion chamber filling, due to approximately uniform oscillation behaviour of the column no opposite air movement, which means an air movement toward the air container 16, will be possible. When equipping the internal combustion engine with the turbocharger 25, it is possible to so accelerate the air columns in the intake systems 4,5 and during the filling phase of the combustion chamber with combustion air that the required quantity of air which means the delivery rate can be introduced in the combustion chamber prior to closing the inlet valves. In order to be able to carry out a compensation of the air volumes in the individual strands of the intake systems 4,5, the air container 16 which is passed through the oil wetted chamber of the motor block, in this instance the oil pan 15 is designed as a compensating container 17 into which lead the strands of the intake systems 4,5 through their respective collecting line 8.

Figure 3:
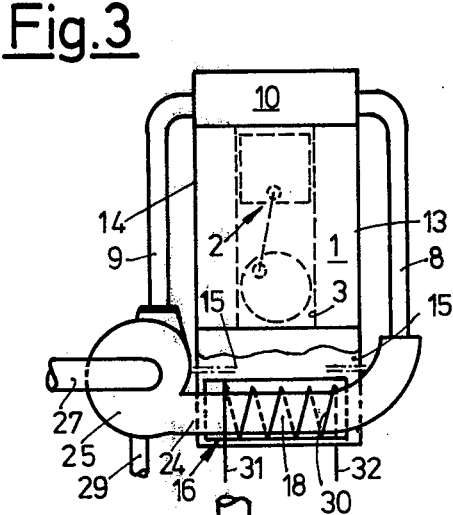
FIG. 3 is an end view of a motor block with the exhaust gas systems and charger group arranged on the left hand side while on the right hand side there are arranged the intake systems and an air container which extends through the motor block and in this particular instance represents an oil cooler.

The embodiment according to FIG. 3 differs primarily from the above mentioned embodiment in that instead of a compensating container 17, the air container 16 is designed as a charging air cooler 18. To this end, the charging air cooler 18 is provided with a cooling system designed as a cooling coil 30. The ends 31, 32 of the cooling coil may be connected to a cooling unit not illustrated in the drawing. As cooling medium for the charging air cooler 18 there may be for instance employed oil. This, however, does not exclude the employment of other cooling substances. The design of the air container 16 as a charging air cooler 18 has the advantage that when arranging the same in the oil pan 15, together therewith also the oil in the oil pan will be cooled whereby the cooling unit proper of the oil pan can be relieved if it is not combined with the unit of the charging air cooler.

Figure 4:
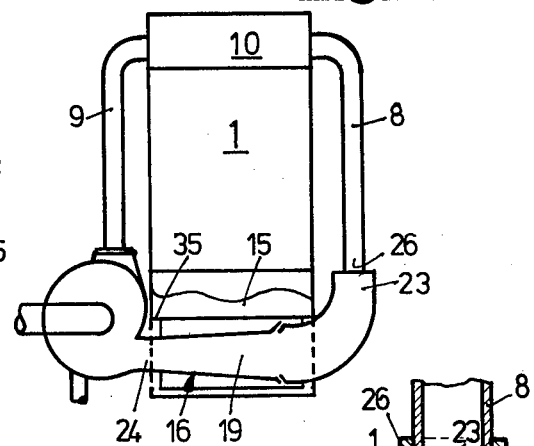
FIG. 4 is an end view of the same motor block as FIG. 3 but with an air container designed as diffuser.
Figure 5:
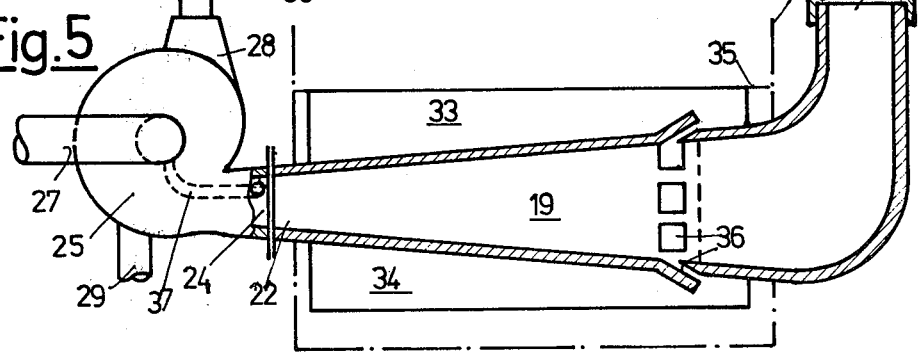
FIG. 5 is an enlarged illustration of an air container designed as diffuser with turbocharger and with an end face of the motor block indicated.

According to the embodiment of FIGS. 4 and 5, the air container 16 is designed as a diffuser which extends conically from the suction side to the pressure side and which has a suction as well as pressure connection 22 and 23 respectively of which the suction connection is preferably connected to the pressure section 24 of a blower of the turbocharger 25 whereas the pressure section 23 of said turbocharger is connected to the collecting lines 8 of the section systems 4, 5 for instance through the intake section 26. In order to be able again to cool the intake air to be depressed through the diffuser 19 by means of the turbocharger 25 which suction air may be considerably heated due to the compression of the turbocharger, the diffuser is on its mantle provided with a row of cooling fins 33, 34 which extend in the longitudinal direction of the diffuser and which therebetween comprise the flow passages for a cooling medium to be passed therethrough. The diffuser 19 equipped with cooling fins 33, 34 is surrounded by a mantle 25 of a chamber for instance the chamber of the oil pan 15, so that the ribs together with the mantle of the diffuser and the mantle of the chamber from the flow passages proper for a cooling medium. In order in this connection to serve as feeding means for conveying said cooling medium, the diffuser 19 is within the region of its pressure connection 23 provided with a row of jet nozzles 36 distributed about the circumference of said pressure connection 23. A portion of the intake air is by said nozzles 36 blown into the atmosphere. Combustion air passing through said jet nozzles 36 into the atmosphere brings about a suction effect on the mantle of the diffuser 19 as a result of which the cooling medium is drawn through the cooling passages and together with the intake air is blown into the atmosphere. The installation of a diffuser as air container 16 furthermore brings about that due to the spacial expansion of the combustion air, especially within the region of the pressure connection 23 of the diffuser, the conveying pressures are reduced so that also the oscillations of the air columns in the intake systems 4,5 can be effective to a greater extent with regard to the charging-up action by oscillation.

In the illustrated embodiments, the conduits of the intake and exhaust systems 4,5 and 6,7 respectively are for reasons of simplified illustration not illustrated with approximately the same length of the individual strands.

With a corresponding design and arrangement of the conduits, it is, however, also possible in connection with an internal combustion engine to design the individual strands approximately of the same length which independently of the presence of a compensating container 17 is advantageous especially for a charge by oscillation. In the illustrated embodiments there is only one air container 16 provided for every two intake systems 4,5. This, however, does not exclude the provision of one air container 16 each for each intake system 4,5. Similarly, it would also be possible to extend the respective air container 16 instead of through the motor block 1 or its oil pan 15, also only below said motor block, and to provide the necessary combination of the air container with the motor block in such a way that the latter and said air container can be connected to the motor block (see dot-dash air containers 16 in FIG. 2).

Analogous to such connection of the air container or containers to the motor block, it is also necessary to provide connecting means for the intake and/or discharge systems 4,5 and 6,7 respectively on the motor block 1 or its oil pan 15. If it should be necessary to mount the shaft of the turbocharger 25 in an air cushion, it is possible to connect the bearing of the shaft through a line 37 with the pressure connection 34 of the turbocharger. In this connection, it was discovered that a pressure differential of for instance only one atmosphere above the atmospheric pressure will suffice to effect the proper mounting.

For the sake of completeness it may also be pointed out that in FIGS. 3 and 4 the shaft of the turbocharger 25, would have to be journalled above the level of the oil in the oil pan 15, especially when the turbocharger is to be journalled in air.

It is, of course, to be understood that the present invention is, by no means, limited to the specific showing in the drawings, but also comprises any modifications within the scope of the appended claims.

What we claim is:

1. A diesel cycle internal combustion engine having a plurality of cylinders arranged in a row in an engine block wherein pistons reciprocate in the cylinders and rotate a crankshaft positioned beneath the pistons, said engine including intake and exhaust ports connected to each cylinder on opposite sides thereof via a cylinder head and an oil pan positioned beneath the block and crankshaft; the improvement characterized by:

intake manifold means having branches connected at one end to the intake ports and connected at the other end to intake trunk means wherein the intake manifold means and intake trunk means extend downwardly adjacent to the block toward said oil pan and wherein the lengths and configuration of the branches are matched to provide substantially equal volumes of intake air for each cylinder when the engine is running;

an air container having two ends, being connected at one end to the first trunk means and passing through the oil pan;

a turbocharger located adjacent to the oil pan and connected to the other end of the air container, and exhaust manifold means having branches connected at one end to the exhaust ports and connected at the other end to exhaust trunk means wherein the exhaust branch means and exhaust trunk means extend downwardly adjacent to the engine block toward said oil pan with the exhaust branch means connected to the turbocharger for driving the turbocharger.

2. The engine of claim 1 wherein the engine includes six cylinders arranged in a line wherein the intake manifold means includes one segment connected to the first three cylinders in the line and one segment connected to the second three cylinders in the line each segment having three branches and one trunk, and wherein the branches connected to the cylinders adjacent the ends of the block are the longest, the branches connected to the cylinders juxtaposed with the cylinders adjacent to the end of the block are shorter and the branches connected to the two innermost cylinders are the shortest.

3. The engine of claim 1 or 2 wherein the air containing means includes means for cooling the intake air stored therein by the turbocharger.

* * * * *